United States Patent [19]

Rojey

[11] 4,344,292
[45] Aug. 17, 1982

[54] PROCESS FOR HEAT PRODUCTION BY MEANS OF A HEAT PUMP OPERATED WITH A SPECIFIC MIXTURE OF FLUIDS AS THE WORKING AGENT

[75] Inventor: Alexandre Rojey, Garches, France

[73] Assignee: Institut Francais du Petrole, Rueil-Malmaison, France

[21] Appl. No.: 226,984

[22] Filed: Jan. 21, 1981

[30] Foreign Application Priority Data

Jan. 21, 1980 [FR] France .................................. 80 01371

[51] Int. Cl.$^3$ ............................................. F25B 00/00
[52] U.S. Cl. ..................................................... 62/114
[58] Field of Search ............................ 62/114, 93, 272

[56] References Cited

U.S. PATENT DOCUMENTS 4,089,186 5/1978 Rojey ..................................... 62/114
4,167,101 9/1979 Rojey ..................................... 62/114

*Primary Examiner*—Ronald C. Capossela
*Attorney, Agent, or Firm*—Millen & White

[57] ABSTRACT

A building is heated by means of a heat pump operated with a mixture of at least two working fluids, the proportion of the minor constituent being from 0.5 to 20% by mole and the difference between the critical temperatures of the two fluids being at least 20° C. Heat is received from a fluid at a temperature between 0° and 20° C.

17 Claims, 1 Drawing Figure

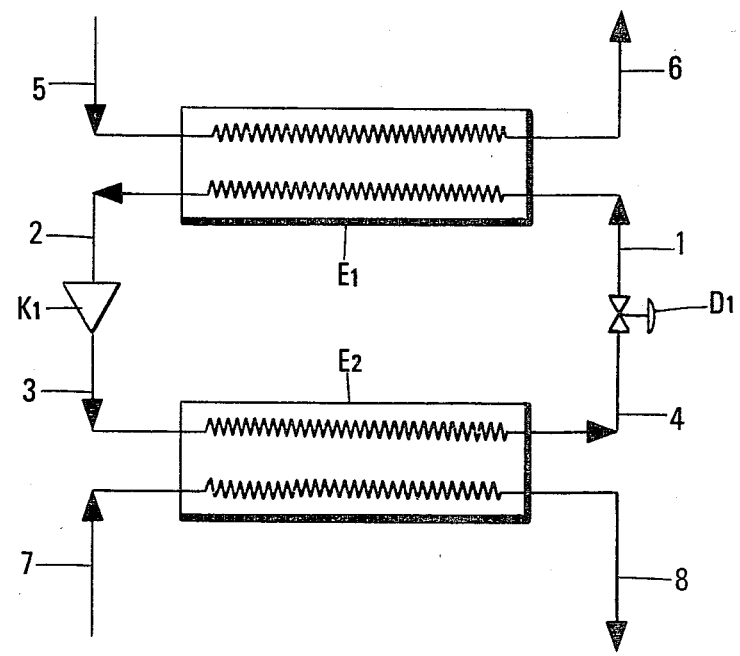

PROCESS FOR HEAT PRODUCTION BY MEANS OF A HEAT PUMP OPERATED WITH A SPECIFIC MIXTURE OF FLUIDS AS THE WORKING AGENT

BACKGROUND OF THE INVENTION

This invention relates to a method of heating by means of a specific mixture of fluids employed as the working agent in a heat pump. U.S. Pat. No. 4,089,186, discloses the use of mixtures in heat-pumps, so as to improve the performance thereof by vaporizing and condensing the mixture in accordance with temperature profiles parallel to those of the external fluids with which the heat exchanges are performed, these heat exchanges being of the counter-current type.

The mixtures are defined in the U.S. Pat. No. 4,089,186, as comprising at least two constituents whose composition does not result in an azeotropic mixture.

The embodiments disclosed in the U.S. Pat. No. 4,089,186, relate to cases where heat is recovered in a wide temperature range. This explains why the U.S. Pat. No. 4,089,186, discloses a preferred embodiment according to which the mixture circulated in the heat-pump is condensed in two stages, so as to supply heat in a narrower temperature range than the temperature range at which heat is recovered. However, in the above embodiment the mixture condenses in a temperature range which comprises temperatures in excess of 40° C.

When heat is recovered in a wide temperature range and the mixture is a binary mixture, the proportions of the two constituents forming the mixture must not be too different. Thus, in the two examples of the U.S. Pat. No. 4,089,186, the mixture consists of 40% chlorodifluoromethane (R-22) and 60% 1,1,2-trichloro-1,2,2-trifluoro ethane (R-113) in one case and 38% propane and 62% normal pentane in the other case.

In another type prior art, the heat-pumps used for heating buildings require other working conditions. As a matter of fact, in many cases, heat is recovered in a relatively narrow temperature range of, for example, 5° to 15° C. These heat-pumps often operate by recovering heat from a fluid, such as water or air, whose temperature is relatively low, for example between 0° and 20° C., and delivering heat to a fluid, such as water or air, whose temperature is also relatively low, for example, between 20° and 40° C.

When using such heat-pumps, the conventionally used working fluid is either monochlorodifluoromethane (R-22) or dichlorodifluoromethane (R-12); the critical temperature, which will be hereinafter called $t_c$, is 96° C. for R-22 and 112° C. for R-12.

As a rule, the higher the boiling temperature and the critical temperature, the more favorable the performance rate; this leads, however, to a high suction rate, thus to a reduced heat capacity for any given compressor employed in the system. The selection of R-22 and R-12 results from a compromise between these two requirements, and as concerns the conventional temperatures used in house-heating, the use of R-12 being more appropriate to relatively high temperature levels, for example, higher than 50° C.

It is usually preferred that these heat pumps be operated with halogenated fluids of the "Freon" type for safety reasons, thus avoiding inflammable materials such as hydrocarbons or toxic materials such as ammonia.

SUMMARY OF THE INVENTION

In accordance with the invention, in order to solve various adaptation and use problems occuring, when the heat-pump operates with a single compound, it is advantageous to employ mixtures comprising a major constituent, called a basic constituent, which is the same as used when the heat-pump operates with a single compound, for example, R-22 or R-12, and a second constituent in limited amount, usually less than 20%, for example 0.5 to 20% by weight of the mixture. In order that the amount of the second constituent remain low, it is necessary that its critical temperature be quite different from the critical temperature of the basic constituent, i.e. the difference between the critical temperatures being at least 20° C.

The mixture may then be defined as "dissymmetric" since the proportions of the constituents of the mixture are quite different.

The second constituent of the dissymmetric mixture may be either a component whose critical temperature is lower than the critical temperature of the basic constituent, or a constituent whose critical temperature is higher than the critical temperature of the basic constituent. It has been found that, in the first case, the improvement resulting from the use of a mixture is far poorer than the improvement obtained in the second case.

BRIEF DESCRIPTION OF THE DRAWING

The drawing illustrates, in schematic form, a heat pump arrangement of the type in which the invention is practiced.

DETAILED DISCUSSION OF THE INVENTION

The invention will now be discussed in greater detail with reference to the following examples, in which the drawing is also discussed.

The following example serves to illustrate how the use of the mixture wherein the minor constituent has a critical temperature higher than the critical temperature of the basic constituent provides more advantages than the reverse situation.

EXAMPLE 1

This example refers to the water-to-water heat-pump shown in the FIGURE.

This heat-pump comprises an evaporator $E_1$ into which the mixture is introduced through duct 1 and from which it is discharged through duct 2 in fully vaporized condition; it also comprises a compressor $K_1$ for compressing the vapor mixture discharged through duct 3 to be fed into condenser $E_2$ from which it is discharged through duct 4 in fully condensed condition; it is finally expanded through the expansion valve $D_1$ and recycled to the evaporator. The evaporator and the condenser consist of double-pipe exchangers, through which the heat-exchanging fluids circulate counter-currently.

1 m$^3$/h of water from a groundwater table is fed through duct 5. This water is supplied at 12° C. and discharged at 4° C. through duct 6. Water is heated in the condenser; it is fed through duct 7 at 20° C. and discharged through duct 8. Its feeding rate is also 1 m$^3$/h.

The heat-pump is first operated with a mixture of R-22, as the basic constituent, and trichlorofluoromethane (R-11) whose critical temperature is 198° C., as the second constituent. By varying the R-11 concentration expressed in % by mole of the mixture, the following results are obtained, as concerns the performance rate (COP), defined as the ratio of the heat power delivered by the heat pump to the electric power consumed by the motor which drives the compressor, and the suction rate (Va) of the compressor, expressed in m³/h.

| % mole R-11 | 0 | 1 | 5 | 6 | 8 |
|---|---|---|---|---|---|
| COP | 3.87 | 3.97 | 5.01 | 5.07 | 4.60 |
| Va (m³/h) | 9.09 | 9.16 | 9.46 | 9.74 | 10.68 |

The above results show that the composition of the mixture is optimum for a 6% R-11 concentration corresponding to a power saving of 23 to 24% with respect to the basic case, this improvement being obtained without modifying the equipement and the exchange surfaces.

There is then used a mixture of R-22 as the basic constituent and chlorotrifluoromethane (R-13), whose critical temperature is 29° C., as the second constituent. By varying the R-13 concentration expressed in % by mole of the mixture, the following results are obtained as concerns the performance rate (COP) and the suction rate of the compressor (Va) expressed in m³/h.

| % mole R-13 | 0 | 4 | 8 | 12 | 22 |
|---|---|---|---|---|---|
| COP | 3.87 | 3.95 | 4.00 | 4.04 | 4.02 |
| Va (m³/h) | 9.09 | 8.57 | 8.12 | 7.71 | 6.92 |

The composition of the mixture passes through an optimum at a 12% R-13 concentration, corresponding to a power saving of 4% with respect to the basic case.

The above example shows that a mixture comprising as the basic constituent R-22 ($t_c = 96°$ C.) and as the second constituent R-11 ($t_c = 198°$ C.) whose critical temperature is higher than the critical temperature of R-22, leads to a power saving which is far greater than that obtained with a mixture comprising as the basic constituent R-22 and as the second constituent R-13 ($t_c = 29°$ C.) whose critical temperature is lower than the critical temperature of R-22. The difference between the critical temperatures, which is at least 20° C., must not be excessive and is usually lower than 150° C.

Useful mixtures according to the invention may be manufactured with a basic constituent which is, for example, chlorodifluoromethane (R-22, $t_c = 96°$ C.), dichlorodifluoromethane (R-12, $t_c = 112°$ C.), bromotrifluoromethane (R-13 B1, $t_c = 67°$ C.), chrolopentafluoroethane (R-115, $t_c = 80°$ C.), difluoroethane (R-152 a, $t_c = 113.5°$ C.) or an azeotrope such as R-502 ($t_c = 82°$ C.), which is an azeotrope of R-22 with R-115 (48.8/52.2% by weight), or R-500 ($t_c = 105.5°$ C.), which is an azeotrope of R-12 with R-31 (78.0/22.0% by weight); and a second constituent whose critical temperature is higher by at least 20° C. than the critical temperature of the basic constituent and which is, for example, trichlorofluoromethane (R-11, $t_c = 198°$ C.), dichlorotetrafluoroethane (R-114, $t_c = 146°$ C.), dichlorohexafluoropropane (R-216, $t_c = 180°$ C.), dichlorofluoromethane (R-21, $t_c = 178.5°$ C.), octafluorocyclobutane (C-318, $t_c = 115°$ C.) or an azeotrope such as R-506 ($t_c = 142°$ C.) which is an azeotrope of R-31 with R-114 (55.1/44.9% b.w.).

Specific examples are:

| R-22 + R-11 |
|---|
| R-22 + R-114 |
| R-115 + R-114 |
| R-12 + R-11 |
| R-12 + R-216 |
| R-502 + R-114 |

As shown by the above example, in each case of use, the optimum value of the molar concentration of the second constituent in the mixture must be selected within the range from 0.5 to 20%; however it must not be selected arbitrarily in order to obtain the full advantages of the invention.

A mixture of the above type has the disadvantage, at a given feed rate by weight or by mole, to lead to a suction feed rate somewhat higher than when using a heat-pump operated with a single compound. However, since the compression rate is lower, it is usually possible either to use the same compressor as with a pure substance, or even a compressor of lower cost. It follows therefrom that a heat-pump operated with a mixture of the above type offers many advantages as compared with a heat-pump operated with a single compound. It can, however, be desired to reduce the size of the compressor and thus to reduce the feed rate by volume corresponding to a given feed rate by weight.

It has also been found, and this is another object of the invention, that the advantages of a greatly improved performance rate can be retained, although decreasing the suction volume of the compressor for a given feed rate by weight or by mole, by using a mixture comprising at least three constituents, including a basic constituent, for example R-12 or R-22, a second constituent whose critical temperature is higher by at least 20° C. than the critical temperature of the basic constituent, for example R-11, R-113 or R-114, and a third constituent whose critical temperature is lower than the critical temperature of the basic constituent, for example monochlorotrifluoromethane (R-13).

The following example will help to properly select the above mixture.

EXAMPLE 2

There is used the same heat-pump as in example 1 (The FIGURE). The water feed rates in the evaporator and the condenser are the same as in example 1; water which releases heat in the evaporator is fed at 12° C. and discharged at 4° C. and water which is heated in the condenser is fed at 20° C.

There is used a mixture of R-22 as the basic constituent, R-11 as the second constituent and R-13 as the third constituent. A mixture comprising 10% of R-13 is prepared and the concentration of R-11 is varied. The following results are obtained, as concerns the performance rate (COP) and the feed rate at the inlet of the compressor (Va) expressed as m³/h.

| % mole R-11 | 0 | 1 | 2 | 3 | 4 | 5 |
|---|---|---|---|---|---|---|
| COP | 4.03 | 4.95 | 4.12 | 4.10 | 4.03 | 3.93 |
| Va (m³/h) | 7.91 | 7.65 | 8.15 | 8.36 | 8.67 | 9.05 |

When using a mixture of the following composition (molar fractions):

| | |
|---|---|
| R-22: | 0.89 |
| R-11: | 0.01 |
| R-13: | 0.10 | a 22% improvement is obtained, as compared with the case where R-22 is used alone.

This improvement is thus similar to that obtained in the optimum case of the first example with a mixture of 94% of R-22 and 6% of R-11. When working at the same molar feed rate of the mixture, an improvement of 21% is obtained, as regards the suction rate, with a mixture of 89% R-22, 1% R-11 and 10% R-13, as compared to the suction rate obtained with a mixture of 94% R-22 and 6% R-11.

The above example is given by way of illustration, and mixtures of different composition and different nature can be used. A mixture of 3 constituents can only be used if it comprises a basic constituent whose concentration is preferably at least 80% by mole, such as R-22 ($t_c=96°$ C.), R-12 ($t_c=112°$ C.), R-13 B1 ($t_c=67°$ C.), R-115 ($t_c=80°$ C.), R-152 a ($t_c=113.5°$ C.) or an azeotrope such as R-502 ($t_c=82°$ C.) or R-500 ($t_c=105.5°$ C.), a second constituent whose critical temperature is higher by at least 20° C. than the critical temperature of the basic constituent, such as R-11 ($t_c=198°$ C.), R-114 ($t_c=146°$ C.), R-216 ($t_c=180°$ C.), R-21 ($t_c=178.5°$ C.), C-318 ($t_c=115°$ C.) or an azeotrope such as R-506 ($t_c=142°$ C.), and a third constituent whose critical temperature is lower by preferably at least 20° C. than the critical temperature of the basic constituent, such as, for example, chlorotrifluoromethane (R-13, $t_c=29°$ C.) or trifluoromethane (R-23, $t_c=25.9°$ C.). When the basic constituent is R-22, the third constituent may also be, for example, bromotrifluoromethane (R-13 B1, $t_c=67°$ C.) or the azeotrope R-504 ($t_c=66°$ C.). The molar concentration of the third constituent in the mixture is between 5 and 20%. This proportion must not be too low in order to take a significant advantage of adding this third constituent; it results therefrom that the difference between the critical temperatures of the basic constituent and the third constituent is preferably lower than 100° C.

The operating conditions are usually so selected that the pressure of the mixture in the evaporator is higher than the atmospheric pressure and that the pressure of the mixture in the condenser does not attain excessive values, for example, values in excess of 30 bars.

The temperature of the mixture at the outlet of the condenser is usually between 0° and 100° C.

The heat-pumps operated with the above-defined mixtures may be of any type.

The compressor may be, for example, a lubricated piston compressor or a dry piston compressor, a screw-compressor or a centrifugal compressor. The exchangers may be, for example, double pipe-exchangers, pipe/-calender-exchangers or plate-exchangers.

The heat power may range, for example, from a few Watts for heat-pumps of the individual heating type to several Megawatts for heat-pumps of the collective heating type.

The present process, based on the use of specific mixtures, is particularly advantageous when heat is taken by allowing the temperature of the external fluid to evolve in a relatively narrow range, preferably lower than 15° C., for example, from 5° to 13° C. (difference between the inlet and outlet temperatures for the external fluid).

What I claim is:

1. In a process for producing heat by means of a heat pump, comprising the steps of (a) circulating a vaporizable working fluid under superatmospheric pressure in counter-current heat exchange with an external fluid which acts as a heat source to progressively increase the temperature of the working fluid to cause progressive vaporization thereof, and simultaneously progressively cooling the external fluid, (b) compressing the vaporized working fluid, (c) circulating the compressed working fluid in counter-current heat exchange with a heating medium for simultaneously heating said medium and condensing the compressed working fluid, and (d) expanding the condensed working fluid and recycling it to step (a), the improvement wherein said process is conducted with a vaporizable working fluid which is a non-azeotrope forming mixture of at least two distinct constituents, including a major basic constituent and at least a second constituent making up 0.5 to 20% by molar concentration of the mixture, and wherein the critical temperature of the major basic constituent differs from that of the at least a second constituent by at least 20° C.

2. In a process for producing heat by means of a heat pump, comprising the steps of (a) circulating a vaporizable working fluid under superatmospheric pressure in counter-current heat exchange with an external fluid which acts as a heat source to progressively increase the temperature of the working fluid to cause progressive vaporization thereof, and simultaneously progressively cooling the external fluid, (b) compressing the vaporized working fluid, (c) circulating the compressed working fluid in counter-current heat exchange with a heating medium for simultaneously heating said medium and condensing the compressed working fluid, and (d) expanding the condensed working fluid and recycling it to step (a), the improvement comprising:
supplying said external fluid, circulated in counter-current heat exchange with the working fluid, at a temperature of at most about +20° C.;
cooling said external fluid in said counter-current circulation to a temperature of no less than about 0° C.; and
wherein said vaporizable working fluid is a non-azeotrope forming mixture of at least two distinct constituents, including a major basic constituent and at least a second constituent making up 0.5 to 20% by weight of the mixture, and wherein the critical temperatures of the major basic constituent differs from that of the at least a second constituent by at least 20° C.

3. A process according to claim 2, wherein the mixture is a mixture of halogenated hydrocarbons.

4. A process according to claim 2 wherein the basic constituent is selected from the following constituents: monochlorodifluoromethane (R-22), dichlorodifluoromethane (R-12), bromotrifluoromethane (R-13 B1), difluoroethane (R-152 a), chloropentafluoroethane (R-115), azeotrope R-502, azeotrope R-500, and the second constituent is selected from the following constituents: trichlorofluoromethane (R-11), dichlorotetrafluoroethane (R-114), dichlorohexafluoropropane (R-216), dichlorofluoromethane (R-21), octafluorocyclobutane (C-318), azeotrope R-506.

5. A process according to claim 2, wherein the mixture comprises monochlorotrifluoromethane (R-22) as the basic constituent and trichlorofluoromethane (R-11) as the second constituent.

6. A process according to claim 2, wherein the mixture comprises at least one third constituent whose critical temperature is lower than the critical temperature of the basic constituent, the difference between the critical temperature of the third constituent and that of the basic constituent being from 20° to 100° C.

7. A process according to claim 6 wherein the critical temperature of the major basic constituent is lower than that of the second constituent and higher than that of the third constituent.

8. A process according to claim 6, wherein the mixture comprises monochlorotrifluoromethane (R-22) as the basic constituent, trichlorofluoromethane (R-11) as the second constituent and chlorotrifluoromethane (R-13) as the third constituent.

9. A process according to claim 6, wherein the molar concentration of the third constituent in the mixture is from 5 to 20%.

10. A process according to claim 2, wherein heat is recovered from the external fluid by allowing the temperature of the latter to evolve within a temperature range narrower than 15° C.

11. A process according to claim 2, wherein said counter-current heat exchange with said heating medium is conducted to that the temperature of the mixture after being condensed is between 0° and 100° C.

12. A process according to claim 2, wherein the heat exchange between the mixture of fluids and the external fluid is effected according to a counter-current heat exchange mode.

13. A process according to claim 2, wherein the heat exchange between the mixture of fluids and the fluid to be heated is effected according to a counter-current heat exchange mode.

14. A process according to claim 2, wherein heat is delivered to a fluid at a temperature between 20° and 40° C.

15. A process according to claim 2 wherein said heating medium is transferred to an enclosed space for heating thereof.

16. A process according to claim 15 wherein said enclosed space is a building.

17. A process according to claim 2 wherein the critical temperature of the at least a second constituent is higher than the critical temperature of the major basic constituent.

* * * * *